(12) United States Patent  
Loebel

(10) Patent No.: US 8,551,237 B2
(45) Date of Patent: Oct. 8, 2013

(54) SYNTHESIS OF COLORANTS IN MIXING APPARATUS

(75) Inventor: Johannes Loebel, Mannheim (DE)

(73) Assignee: BASF SE, Ludwigshafen (DE)

( * ) Notice: Subject to any disclaimer, the term of this patent is extended or adjusted under 35 U.S.C. 154(b) by 237 days.

(21) Appl. No.: 12/744,425

(22) PCT Filed: Dec. 4, 2008

(86) PCT No.: PCT/EP2008/066788
§ 371 (c)(1),
(2), (4) Date: May 24, 2010

(87) PCT Pub. No.: WO2009/074504
PCT Pub. Date: Jun. 18, 2009

(65) Prior Publication Data
US 2010/0242792 A1    Sep. 30, 2010

(30) Foreign Application Priority Data
Dec. 10, 2007 (EP) .................................. 07122787

(51) Int. Cl.
C09B 5/62   (2006.01)

(52) U.S. Cl.
USPC .............. 106/31.47; 8/636; 544/245; 546/37; 524/90; 106/506

(58) Field of Classification Search
USPC ............................................................ 8/636
See application file for complete search history.

(56) References Cited

U.S. PATENT DOCUMENTS

| | | | |
|---|---|---|---|
| 2,543,747 A | | 3/1951 | Shrader |
| 2,715,127 A | | 8/1955 | Meier et al. |
| 3,787,406 A | * | 1/1974 | Ulrich et al. .................. 544/187 |
| 4,238,386 A | | 12/1980 | Babler |
| 4,450,273 A | * | 5/1984 | Graser ............................ 546/37 |
| 6,391,104 B1 | * | 5/2002 | Schulz ........................... 106/494 |
| 6,403,797 B1 | * | 6/2002 | Sandefur et al. ................ 546/37 |
| 6,462,128 B1 | | 10/2002 | Barashkov et al. |
| 2006/0063855 A1 | * | 3/2006 | Kaul ............................. 523/160 |
| 2006/0246023 A1 | | 11/2006 | Kaul |
| 2007/0119345 A1 | | 5/2007 | Kaul |
| 2007/0151478 A1 | * | 7/2007 | Erk et al. ...................... 106/31.6 |

FOREIGN PATENT DOCUMENTS

| | | |
|---|---|---|
| CH | 451 943 | 5/1968 |
| DE | 386 057 | 12/1923 |
| DE | 1 055 156 | 4/1959 |
| DE | 1 067 157 | 10/1959 |
| DE | 1 067 548 | 10/1959 |
| DE | 1 067 951 | 10/1959 |
| DE | 1 067 952 | 10/1959 |
| DE | 1 067 953 | 10/1959 |
| DE | 1 070 317 | 12/1959 |
| DE | 24 51 780 | 2/1976 |
| EP | 1 172 417 | 1/2002 |
| EP | 1 217 043 | 6/2002 |
| WO | 2004 076457 | 9/2004 |
| WO | 2005 078023 | 8/2005 |
| WO | 2005 085364 | 9/2005 |
| WO | 2006 114403 | 11/2006 |

OTHER PUBLICATIONS

Copending U.S. Appl. No. 12/667,334 to Loebel et al., 371 filed, Dec. 30, 2009.*

(Continued)

Primary Examiner — Harold Pyon
Assistant Examiner — Katie L Hammer
(74) Attorney, Agent, or Firm — Oblon, Spivak, McClelland, Maier & Neustadt, L.L.P.

(57) ABSTRACT

A process for preparing colorants of the general formula (Ia), (Ib) or (Ic)

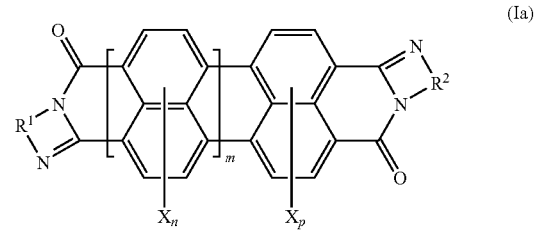

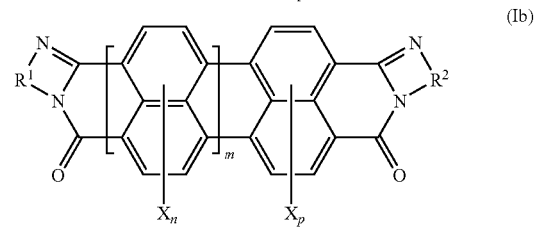

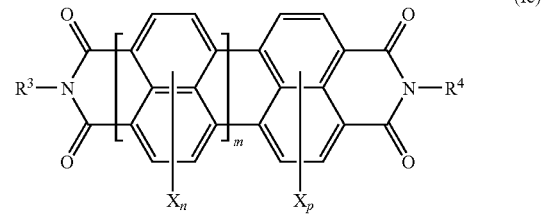

or mixtures thereof, comprises reacting
(a) tetracarboxylic acids or their functional derivatives with
(b) at least one compound selected from
  i. aliphatic amines,
  ii. aromatic amines,
  iii. aliphatic diamines,
  iv. aromatic diamines,
(c) optionally in the presence of further additives,
(d) optionally in the presence of wetting agents
in a mixing apparatus. These colorants are useful for coloration of macromolecular organic and inorganic materials of natural and synthetic origin.

20 Claims, No Drawings

(56) References Cited

OTHER PUBLICATIONS

Patterson Mil-Reactor® Features & Benefits, (attached as PDF, accessed on the Internet Wayback Machine from Oct. 31, 2006, website www.pattersonindustries.com/7c.html).*

U.S. Appl. No. 13/122,514, filed Apr. 4, 2011, Kleine Jaeger, et al.
International Search Report issued Nov. 11, 2009 in PCT/EP08/066788 filed Dec. 4, 2008.

* cited by examiner

SYNTHESIS OF COLORANTS IN MIXING APPARATUS

The present invention relates to processes for preparing colorants. The present invention further relates to the use of colorants for coloration of macromolecular organic and inorganic materials of natural and synthetic origin. Further embodiments of the present invention will be apparent from the claims, the description and the examples. It will be understood that the aforementioned and the hereinbelow still to be elucidated features of the subject matter according to the present invention are usable not only in the particular combination specifically disclosed but also in other combinations without going beyond the scope of the present invention.

It will be known that the reaction of perylene-3,4,9,10-tetracarboxylic acid (perylenetetracarboxylic acid) or naphthalene-1,4,5,8-tetracarboxylic acid (naphthalenetetracarboxylic acid) or derivatives thereof with ammonia or primary aliphatic or aromatic amines gives vat dyes that dye vegetable and animal fibers in red shades. These dyes have been known since about 1913 (perylene) or 1924 (perinone). They can be prepared in organic solvents or in an aqueous medium, but also in the absence of any diluent (DE 386057, U.S. Pat. No. 2,543,747, U.S. Pat. No. 2,715,127).

Perinone and perylene pigments have been used for about 50 years for coloration of paints, plastics and printing inks. The reaction of naphthalenetetracarboxylic acid or perylenetetracarboxylic acid or derivatives thereof with primary aliphatic or aromatic amines in an organic medium also gives a crude pigment which is generally adapted to the intended application medium in one or more comminuting or crystallizing steps (DE 10 55 156, DE 10 67 157, DE 10 67 548, DE 10 67 951, DE 10 67 952, DE 10 67 953, DE 10 70 317). In general, a large excess of solvent is used.

DE 24 51 780 describes for example the preparation and use of perylenetetracarboxylic diimides as black dyes. These compounds are prepared by reaction of perylene-3,4,9,10-tetracarboxylic dianhydride (perylenetetracarboxylic dianhydride) and n-propylamine in an aqueous medium at 130° C. The dye compounds are preferably used for coloration of paint, plastic and as aqueous pigment preparations.

WO 2005/085364 A1 discloses the preparation of organic pigments and their precursors in "All-In-One Reactors", kneaders and paddle dryers. The preparation of quinacridone, isoindoline, isoindolinone and quinophthalone pigments is explicated.

WO 2004/0764570 A1 describes the solvent-free synthesis of 1,4-diketopyrrolo-[3,4-c]pyrrole and its uses including coloration of paints, liquid inks and plastics.

It is an object of the present invention to develop a process for preparing colorants, in particular perinone or perylene dyes or pigments, which requires less solvent and is economical to carry out. It is a further object of the present invention to find a process whereby colorants can be synthesized using a minimum of apparatus. It is another object of the present invention to provide a process for preparing colorants wherein the product is ideally further processible directly.

We have found that these and other objects are achieved, as is apparent from the disclosure content of the present invention, by the various embodiments of the process according to the present invention that are described in what follows.

The present invention accordingly provides a process for preparing colorants of the general formula (Ia), (Ib) or (Ic)

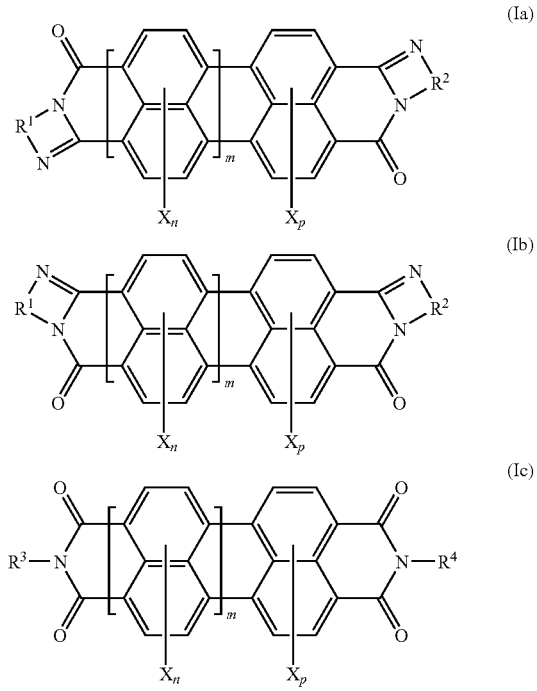

or mixtures thereof, where $R^1$ and $R^2$ are the same or different and independently represent phenylene, naphthylene, pyridylene,

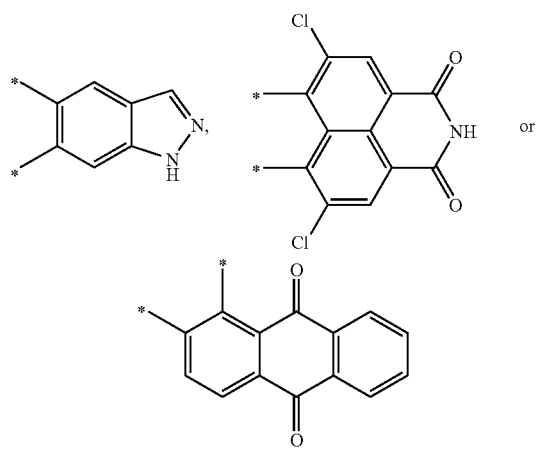

and $R^1$ and $R^2$ may each be substituted one or more times by $C_1$-$C_{22}$-alkyl, $C_3$-$C_{22}$-alkenyl, $C_1$-$C_{22}$-alkoxy, hydroxyl, nitro and/or halogen, $R^3$ and $R^4$ are the same or different and independently represent hydrogen, $C_1$-$C_{22}$-alkyl, aryl, $C_1$-$C_{22}$-aralkyl,

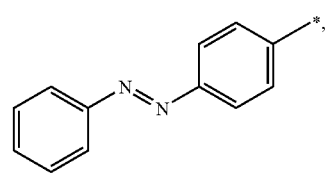

-continued

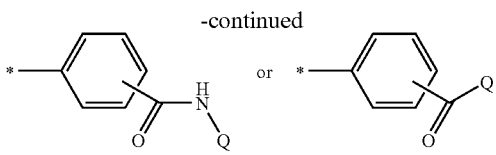

Q: $C_1$-$C_{20}$-alkyl, aryl and $R^3$ and $R^4$ may each be substituted one or more times by $C_1$-$C_{22}$-alkyl, $C_1$-$C_{22}$-alkoxy, hydroxyl, nitro and/or halogen, X in each occurrence is the same or different and independently represents halogen, n and p are independently 0, 1, 2, 3 or 4, m is 0, 1, 2, 3 or 4, which comprises reacting
(a) tetracarboxylic acids or their functional derivatives with
(b) at least one compound selected from
  i. aliphatic amines,
  ii. aromatic amines,
  iii. aliphatic diamines,
  iv. aromatic diamines,
(c) optionally in the presence of further additives,
(d) optionally in the presence of wetting agents wherein the reaction is carried out in a mixing apparatus.

Preference for use as mixing apparatus is given to apparatus for kneading or grinding solid materials or high-viscosity suspensions, so-called millbase materials. Millbase materials are therefore the materials on which the kneading/grinding operation is carried out.

The term "mixture" in this context shall comprise not only physical mixtures but also solid solutions (mixed crystals) of the compounds (Ia), (Ib) and/or (Ic).

Expressions of the form $C_a$-$C_b$ herein designate chemical compounds or substituents having a certain number of carbon atoms. The number of carbon atoms can be selected from the entire range from a to b, including a and b, where a is at least 1 and b is always greater than a. A further specification of the chemical compounds or the substituents is effected by expressions of the form $C_a$-$C_b$—V, where V represents a chemical class of compounds or class of substituents, for example alkyl compounds or alkyl substituents.

Halogen represents fluorine, chlorine, bromine or iodine, preferably fluorine, chlorine or bromine, more preferably chlorine or bromine.

Specifically, the collective terms indicated for the various substituents have the following meanings:

$C_1$-$C_{22}$-Alkyl: straight-chain or branched hydrocarbyl radicals having up to 22 carbon atoms, preferably $C_1$-$C_{12}$-alkyl, for example $C_1$-$C_{10}$-alkyl or $C_{11}$-$C_{22}$-alkyl, more preferably $C_1$-$C_{10}$-alkyl, for example $C_1$-$C_3$-alkyl, such as methyl, ethyl, propyl, isopropyl, or $C_4$-$C_6$-alkyl, n-butyl, sec-butyl, tert-butyl, pentyl, 2-methylbutyl, 1,1-dimethylpropyl, 1,2-dimethylpropyl, 2,2-dimethylpropyl, 1-ethylpropyl, hexyl, 2-methylpentyl, 3-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 2-ethylbutyl, 1,1,2-trimethylpropyl, 1,2,2-trimethylpropyl, 1-ethyl-1-methylpropyl, 1-ethyl-2-methylpropyl, or $C_7$-$C_{10}$-alkyl, such as heptyl, octyl, 2-ethylhexyl, 2,4,4-trimethylpentyl, 1,1,3,3-tetramethylbutyl, nonyl or decyl and also isomers thereof.

$C_3$-$C_{22}$-Alkenyl: unsaturated, straight-chain or branched hydrocarbyl radicals having 3 to 22 carbon atoms and a double bond in any desired position, for example $C_3$-$C_{10}$-alkenyl or $C_{11}$-$C_{22}$-alkenyl, preferably $C_3$-$C_{10}$-alkenyl such as $C_3$-$C_4$-alkenyl, such as 1-propenyl, 2-propenyl, 1-methylethenyl, 1-butenyl, 2-butenyl, 3-butenyl, 1-methyl-1-propenyl, 2-methyl-1-propenyl, 1-methyl-2-propenyl, 2-methyl-2-propenyl, or $C_5$-$C_6$-alkenyl, such as 1-pentenyl, 2-pentenyl, 3-pentenyl, 4-pentenyl, 1-methyl-1-butenyl, 2-methyl-1-butenyl, 3-methyl-1-butenyl, 1-methyl-2-butenyl, 2-methyl-2-butenyl, 3-methyl-2-butenyl, 1-methyl-3-butenyl, 2-methyl-3-butenyl, 3-methyl-3-butenyl, 1,1-dimethyl-2-propenyl, 1,2-dimethyl-1-propenyl, 1,2-dimethyl-2-propenyl, 1-ethyl-1-propenyl, 1-ethyl-2-propenyl, 1-hexenyl, 2-hexenyl, 3-hexenyl, 4-hexenyl, 5-hexenyl, 1-methyl-1-pentenyl, 2-methyl-1-pentenyl, 3-methyl-1-pentenyl, 4-methyl-1-pentenyl, 1-methyl-2-pentenyl, 2-methyl-2-pentenyl, 3-methyl-2-pentenyl, 4-methyl-2-pentenyl, 1-methyl-3-pentenyl, 2-methyl-3-pentenyl, 3-methyl-3-pentenyl, 4-methyl-3-pentenyl, 1-methyl-4-pentenyl, 2-methyl-4-pentenyl, 3-methyl-4-pentenyl, 4-methyl-4-pentenyl, 1,1-dimethyl-2-butenyl, 1,1-dimethyl-3-butenyl, 1,2-dimethyl-1-butenyl, 1,2-dimethyl-2-butenyl, 1,2-dimethyl-3-butenyl, 1,3-dimethyl-1-butenyl, 1,3-dimethyl-2-butenyl, 1,3-dimethyl-3-butenyl, 2,2-dimethyl-3-butenyl, 2,3-dimethyl-1-butenyl, 2,3-dimethyl-2-butenyl, 2,3-dimethyl-3-butenyl, 3,3-dimethyl-1-butenyl, 3,3-dimethyl-2-butenyl, 1-ethyl-1-butenyl, 1-ethyl-2-butenyl, 1-ethyl-3-butenyl, 2-ethyl-1-butenyl, 2-ethyl-2-butenyl, 2-ethyl-3-butenyl, 1,1,2-trimethyl-2-propenyl, 1-ethyl-1-methyl-2-propenyl, 1-ethyl-2-methyl-1-propenyl or 1-ethyl-2-methyl-2-propenyl, and also $C_7$-$C_{10}$-alkenyl, such as the isomers of heptenyl, octenyl, nonenyl or decenyl.

$C_1$-$C_{22}$-Alkoxy: denotes a straight-chain or branched alkyl group having 1 to 22 carbon atoms (as mentioned above) which are attached via an oxygen atom (—O—), for example $C_1$-$C_{10}$-alkoxy or $C_{11}$-$C_{22}$-alkoxy, preferably $C_1$-$C_{10}$-alkyloxy, more preferably $C_1$-$C_6$-alkoxy, for example methoxy, ethoxy, propoxy, butoxy, pentoxy, hexoxy.

Aryl: a mono- to ternuclear aromatic ring system comprising 6 to 14 carbon ring members, for example phenyl, naphthyl or anthracenyl, preferably a mono- to binuclear such ring system.

$C_1$-$C_{22}$-Aralkyl: denotes a straight-chain or branched alkyl group having 1 to 22 carbon atoms (as mentioned above) wherein a hydrogen atom is replaced by aryl, for example $C_1$-$C_{10}$-aralkyl or $C_{11}$-$C_{22}$-aralkyl, preferably $C_1$-$C_{10}$-aralkyl, more preferably $C_1$-$C_6$-aralkyl.

Heterocycles: five- to twelve-membered, preferably five- to nine-membered, more preferably five- to six-membered ring systems comprising oxygen, nitrogen and/or sulfur atoms and one or more rings, such as furyl, thiophenyl, pyrryl, pyridyl, indolyl, benzoxazolyl, dioxolyl, dioxyl, benzimidazolyl, benzthiazolyl, dimethylpyridyl, methylquinolyl, dimethylpyrryl, methoxyfuryl, dimethoxypyridyl, difluoropyridyl, methylthiophenyl, isopropylthiophenyl or tert-butylthiophenyl. Also including for example piperidinyl or pyrrolidinyl.

Hetaryl: heterocyclic substituents formally derived from aryl groups by one or more methine (—C=) and/or vinylene groups (—CH=CH—) being replaced by ter- or bivalent heteroatoms. Preferred heteroatoms are oxygen, nitrogen and/or sulfur. Particularly preferred heteroatoms are nitrogen and/or oxygen.

$C_3$-$C_{12}$-Cycloalkyl: monocyclic, saturated hydrocarbyl groups having from 3 up to 12 carbon ring members, preferably $C_3$-$C_8$-cycloalkyl such as cyclopropyl, cyclobutyl, cyclopentyl, cyclohexyl, cycloheptyl or cyclooctyl.

$C_1$-$C_{22}$-Alkylene: straight-chain or branched hydrocarbyl radicals having 1 to 22 carbon atoms, for example $C_2$-$C_{10}$- alkylene or $C_{11}$-$C_{22}$-alkylene, preferably $C_2$-$C_{10}$-alkylene, in particular methylene, dimethylene, trimethylene, tetramethylene, pentamethylene or hexamethylene.

Heteroatoms: are preferably oxygen, nitrogen, sulfur or phosphorus.

By "perylenetetracarboxylic acids" are meant perylene-3,4:9,10-tetracarboxylic acids.

By "naphthalenetetracarboxylic acids" are meant naphthalene-1,4:5,8-tetracarboxylic acids.

"Tetracarboxylic acids" and anhydrides thereof are for example naphthalenetetracarboxylic acids or perylenetetracarboxylic acids or their (bis)anhydrides and generally compounds of the general formula (II) and (III) respectively:

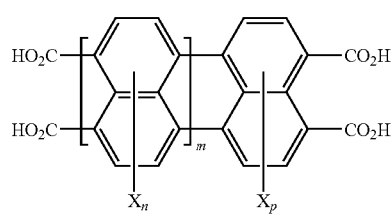

(II)

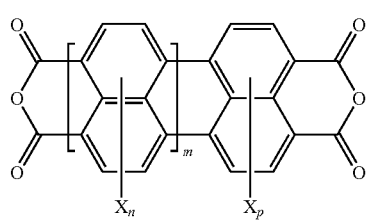

(III)

where the symbols and indices have the meanings indicated for the compounds of the general formula (Ia), (Ib) or (Ic).

The tetracarboxylic acids, or their functional derivatives, used in the process of the present invention are either commercially available or can be prepared in a conventional manner (W. Herbst, K. Hunger, "Industrielle organische Pigmente", 1987, VCH Verlag, Weinheim, p. 473 ff).

By "functional derivatives" of tetracarboxylic acids are meant compounds which, under the reaction conditions of the process of the present invention, are capable of reacting with amines or diamines to form the colorants. In particular the tetracarboxylic anhydrides (bisanhydrides), tetracarbonyl chlorides or salts of tetracarboxylic acids are suitable. Bisanhydrides are preferably used.

Tetracarboxylic acids or their functional derivatives, especially bisanhydrides, can be used as starting materials in the process of the present invention in the form of dried crude material, precomminuted crude material or preferably as as-synthesized water-moist presscake (W. Herbst, K. Hunger, "Industrielle organische Pigmente", 1987, VCH Verlag, Weinheim, p. 473 ff).

Aliphatic amines: any desired primary aliphatic amines $H_2N$—$R^{alk}$, where $R^{alk}$ can be an H, $C_1$-$C_{22}$-alkyl, $C_3$-$C_{22}$-alkenyl or $C_3$-$C_{12}$-cycloalkyl and where $R^{alk}$ may in each case be substituted one or more times, preferably less than five times and most preferably less than three times, in any desired position, by halogen, hydroxyl, nitro and/or aryl and these substituents may likewise be substituted not more than two times and preferably not more than once with the groups mentioned. $R^{alk}$ preferably represents H or substituted or unsubstituted $C_1$-$C_{22}$-alkyl. Aliphatic amine is more preferably understood as meaning $NH_3$, methylamine, ethylamine, propylamine or hydroxypropylamine. "Aliphatic amine" in this context therefore also comprises ammonia ($NH_3$).

Aliphatic diamines: any desired aliphatic amines bearing two primary amine groups $H_2N$—$R^{diamine}$—$NH_2$, where $R^{diamine}$ can be a chemical bond or $C_1$-$C_{22}$-alkylene and where $R^{diamine}$ may in each case be substituted one or more times, preferably less than five times and more preferably less than three times, in any desired position, by halogen, hydroxyl, nitro, $C_1$-$C_{22}$-alkyl or aryl and these substituents may likewise be substituted not more than twice preferably not more than once with the groups mentioned. $R^{diamine}$ is preferably a chemical bond, methylene, dimethylene or trimethylene. More preferably, aliphatic diamine is substituted or unsubstituted hydrazine.

Aromatic amines: any desired primary aromatic amines $H_2N$—$R^{arom}$, where $R^{arom}$ may be aryl or hetaryl and where $R^{arom}$ may in each case be substituted one or more times, preferably less than five times and more preferably less than three times, in any desired position, by $C_1$-$C_{22}$-alkyl, $C_1$-$C_{22}$-alkoxy, $C_3$-$C_{22}$-alkenyl, halogen, hydroxyl, nitro and/or aryl and these substituents may likewise be substituted not more than twice and preferably not more than once with the groups mentioned. $R^{arom}$ is preferably substituted or unsubstituted phenyl. More preferably, aromatic amine is to be understood as meaning all the isomers of xylidine, methoxyaniline, ethoxyaniline. Aromatic amines further comprehend compounds wherein $R^{arom}$ has the following structures:

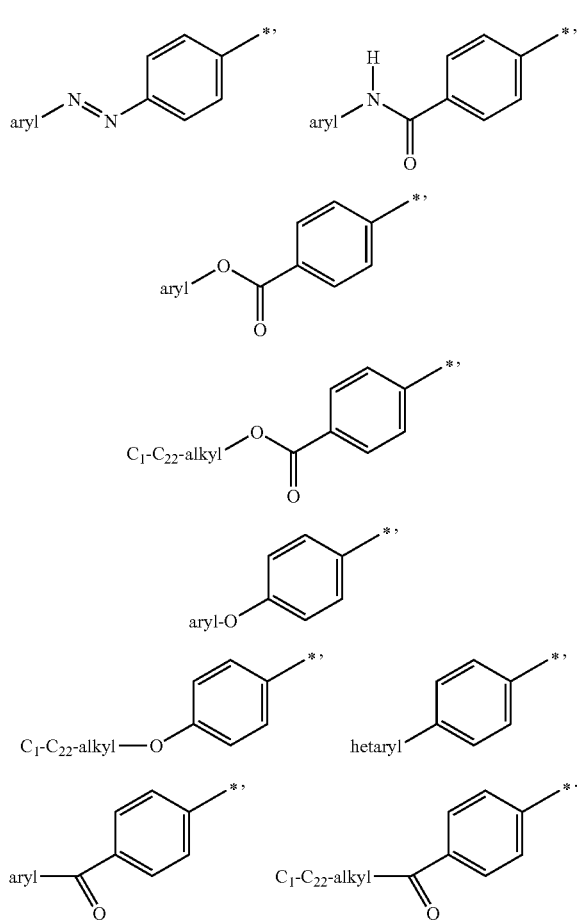

The following are preferred for use as R$^{arom}$:

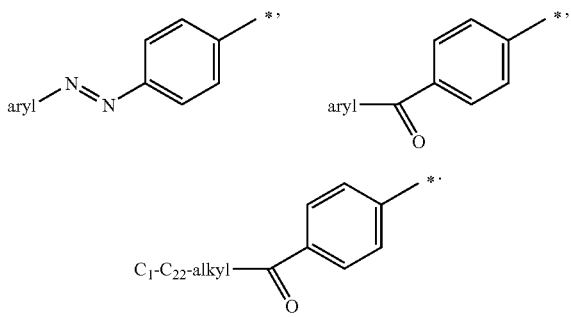

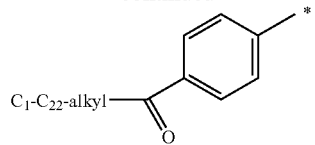

Aromatic diamines: any aromatic amines bearing two primary amine groups H$_2$N—R$^{ardiamine}$—NH$_2$, where R$^{ardiamine}$ may be arylene or hetarylene and where R$^{diamine}$ may in each case be substituted one or more times, preferably less than five times and more preferably less than three times, at any desired position, by C$_1$-C$_{22}$-alkyl, C$_3$-C$_{22}$-alkenyl, halogen, hydroxyl, SO$_3$H, SO$_3$R' (R'=methyl, ethyl, phenyl) and/or nitro and these substituents may likewise be substituted not more than twice and preferably not more than once with the groups mentioned. R$^{ardiamine}$ is preferably substituted or unsubstituted phenylene. Aromatic diamine herein refers more preferably to the following ortho- or peri-diamines: 1,2-diaminobenzene, 2,3-diaminopyridine, 3,4-diaminopyridine, 4,5-diaminopyrimidine, 1,8-diaminonaphthalene, 4,5-diaminoquinoline, 4,5-diaminoisoquinoline, 1,8-diaminoisoquinoline. It is very particularly preferable to use 1,2-diaminobenzene or 1,8-diaminonaphthalene as aromatic diamines.

Aliphatic and aromatic amines and diamines are frequently commercially available.

The process of the present invention is preferably used to produce colorants of the general formulae (Ia) and (Ib) wherein R$^1$ and R$^2$ are independently phenylene or naphthylene which may each be substituted one or more times by C$_1$-C$_{22}$-alkyl, C$_3$-C$_{22}$-alkenyl, C$_1$-C$_{22}$-alkoxy, hydroxyl and/or halogen. It is particularly preferable for the two R$^1$ and R$^2$ radicals to be the same and unsubstituted.

The process of the present invention is likewise preferably used to produce colorants of the general formulae (Ic) wherein R$^3$ and R$^4$ are independently hydrogen, C$_1$-C$_{22}$-alkyl, aryl or

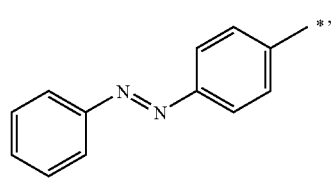

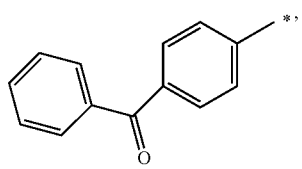

where R$^3$ and R$^4$ may each be substituted one or more times by C$_1$-C$_{22}$-alkyl, C$_1$-C$_{22}$-alkoxy, hydroxyl and/or halogen. It is very particularly preferable for R$^3$ and R$^4$ to be independently C$_1$-C$_{20}$-alkoxyphenyl, methyl, propyl, 2,4-dimethylphenyl or hydrogen.

It is particularly preferable for the two R$^3$ and R$^4$ radicals to be the same and unsubstituted.

The indices n and p in the formulae (Ia), (Ib) and (Ic) are preferably independently 0, 1 or 2 and more preferably n and p are both U.

The index m in the formulae (Ia), (Ib) and (Ic) is preferably 0, 1 or 2 and more preferably m is 0 or 1.

Preference or more particular preference is given to those embodiments of the process according to the present invention wherein the substituents R$^1$, R$^2$, R$^3$, R$^4$ and X and the indices n, p and m assume respectively their preferred and particularly preferred meanings.

If desired, one embodiment of the production process according to the present invention may also utilize mixtures of various aliphatic and/or aromatic amines (i), (ii) and/or diamines (iii), (iv) as component (b). The composition of these mixtures can vary between wide limits, according to properties desired for the colorants. Mixtures of two different amines and/or diamines are preferably used. Preferably up to 10% by weight and more preferably up to 5% by weight of the first amine and/or diamine is replaced by the second amine and/or diamine to obtain colorants having modified properties.

The process of the present invention preferably utilizes either only aliphatic amines (i) or only aromatic amines (ii) as component (b).

The process of the present invention likewise preferably utilizes either only aliphatic diamines (iii) or only aromatic diamines (iv) as component (b).

The molar ratio of the components (b) ((i), (ii), (iii) and (iv)—amines and diamines in total) to the tetracarboxylic acids or their functional derivatives (a), in particular bisanhydrides, is generally in the range from 1.8:1 to 4:1, preferably in the range from 1.9:1 to 3:1 and more preferably in the range from 1.9:1 to 2.5:1.

When an excess of tetracarboxylic acids or their functional derivatives, in particular bisanhydrides, is used, one embodiment of the process according to the present invention comprises adding an inorganic basic salt, preferably potassium carbonate or potassium hydroxide, after the reaction has taken place.

When an excess of amines or diamines is used, one embodiment of the process according to the present invention comprises adding an inorganic or organic acid, preferably acetic acid, and/or washing with inorganic or organic acid in the workup after the reaction has taken place.

The production of colorants of the general formula (Ia), (Ib) or (Ic) or of their mixtures is effected in accordance with the present invention by reaction of tetracarboxylic acids or their functional derivatives (a) with (b), amines (i), (ii) or diamines (iii), (iv) in a mixing apparatus. The mixing apparatus is in operation for at least some of the reaction time. Preferably, the mixing apparatus is operated throughout the entire reaction; more particularly, a kneading or grinding operation is carried out throughout the entire reaction. This preferably produces a crude pigment. Crude pigments are a colorant which in its as-synthesized state has physical properties (in particular crystal size and shape) such that it cannot be directly incorporated in the application medium, for example a paint or plastic.

One embodiment of the process according to the present invention comprises utilizing additives as component (c).

These additives are preferably utilized as catalysts for the reaction. Secondary or tertiary amines are preferred additives. It is believed that the secondary or tertiary amine has the role of a catalyst for the reaction and is generally able to influence the particle size and particle shape of the pigment's primary particles. According to application, it is therefore possible to produce specific colorant particles depending on the choice of secondary or tertiary amine.

Suitable secondary or tertiary amines are aliphatic, cycloaliphatic, arylaliphatic or heterocyclic, secondary or tertiary amines, which are frequently commercially available.

In general, suitable secondary amines have the formula R'R"NH, where R' and R" may be the same or different and each represent $C_1$-$C_{22}$-alkyl, $C_3$-$C_{12}$-cycloalkyl, aryl or heterocycles, in which case R' and R" may be substituted by hydroxyl, $C_1$-$C_6$-alkoxy, $C_1$-$C_6$-alkylamino or aryl groups or combine with the nitrogen atom from R'R"NH to form a 5- or 6-membered, heterocyclic ring which may also comprise further heteroatoms. Preferably R' and R" are the same or different and each represent $C_1$-$C_8$-alkyl, $C_3$-$C_8$-cycloalkyl, aryl, which may each be substituted as described above. It is further preferable for R' and R" to combine with the nitrogen atom to form a 5- or 6-membered, heterocyclic ring which may comprise a further nitrogen atom.

Particularly preferred secondary amines are imidazole, piperazine, N-cyclohexylmethylamine and N-cyclohexylethylamine.

In general, suitable tertiary amines have the formula R'R"NR''', where R' and R" may be the same or different and each represent $C_1$-$C_{22}$-alkyl, $C_3$-$C_{12}$-cycloalkyl, aryl or heterocycles, in which case R' and R" may be substituted by hydroxyl, $C_1$-$C_6$-alkoxy, $C_1$-$C_6$-alkylamino or aryl groups or combine with the nitrogen atom from R'R"NR''' to form a 5- or 6-membered, heterocyclic ring which may also comprise further heteroatoms. Preferably R' and R" are the same or different and each represent $C_1$-$C_8$-alkyl, $C_3$-$C_8$-cycloalkyl, aryl, which may each be substituted as described above. It is further preferable for R' and R" to combine with the nitrogen atom to form a 5- or 6-membered, heterocyclic ring which may comprise a further nitrogen atom. Particular preference is given to N-methylimidazole, pyridine and pyrimidine.

R''' is $C_1$-$C_{22}$-alkyl or aryl that may be substituted by hydroxyl, $C_1$-$C_6$-alkoxy, $C_1$-$C_6$-alkyl, $C_1$-$C_6$-alkylamino or aryl groups. Preferably R''' is $C_1$-$C_6$-alkyl or aryl.

Preferred secondary or tertiary amines are piperazine, N-(2-hydroxyethyl)piperazine, diethanolamine, N,N'-dimethylpiperazine, N-ethylpiperazine, N-methylcyclohexylamine, imidazole, N-methylimidazole or pyrrolidine. Particularly preferred secondary amines are piperazine and N-methylcyclohexylamine. A particularly preferred tertiary amine is N-methylimidazole.

The molar ratio of the secondary or tertiary amine to the tetracarboxylic acids or their functional derivatives, in particular bisanhydrides, is generally in the range from 0.5:1 to 2:1 and preferably in the range from 0.8:1 to 1.3:1.

Further suitable optional additives (c) are Lewis acids. Preferred Lewis acids are $AlCl_3$, $ZnCl_2$ or $SnCl_4$. The molar ratio of the Lewis acids to tetracarboxylic acids or their functional derivatives, in particular bisanhydrides, is generally in the range from 0.1:1 to 2:1, and preferably in the range from 0.5:1 to 1.5:1.

Useful additives (c) further include pigment synergists. Preferred pigment synergists are substituted perylenetetracarboxylic acids or perylenetetracarboxylic imide derivatives other than compounds (Ia)-(Ic), or sulfonated copper phthalocyanine derivatives (for example, selected Solsperse® from Luprizol). The molar ratio of pigment synergists to tetracarboxylic acids or their functional derivatives, in particular bisanhydrides, is generally in the range from 0.01:1 to 0.3:1 and preferably in the range from 0.02:1 to 0.1:1.

Useful additives (c) further include surface-active substances. Ionic or nonionic (polymeric) surfactants are suitable in principle for use as surface-active substances. Examples of surface-active substances useful as additives in the further processing in the process of the present invention are polyethers, which may be nonionically or anionically modified, examples being ethoxylation products of long-chain alcohols or ethoxylation products of alkylphenols.

Therefore, not only various nonionic but also various ionic, especially anionic, surface-active substances and also mixtures of nonionic and ionic, especially anionic, surface-active substances may be present.

Examples of anionic surface-active substances are the acidic phosphoric, phosphonic, sulfuric and/or sulfonic esters of the abovementioned modified polyethers and/or salts thereof.

The abovementioned nonionic surface-active substances based on polyethers (polyethers modified to be nonionic) comprise in particular polyalkylene oxides or reaction products of alkylene oxides with alcohols, amines, aliphatic carboxylic acids or aliphatic carboxamides. In accordance with the present invention, the term alkylene oxide shall here also comprehend aryl-substituted alkylene oxide, in particular phenyl-substituted ethylene oxide.

Of very particular suitability in this context are block copolymers comprising polypropylene oxide and polyethylene oxide blocks or else poly(phenyl ethylene oxide) and polyethylene oxide blocks. Like the unmixed polyalkylene oxides, they are obtainable by polyaddition of these alkylene oxides onto starter compounds, as onto saturated or unsaturated aliphatic and aromatic alcohols, saturated or unsaturated and aliphatic and aromatic amines, saturated or unsaturated aliphatic carboxylic acids and carboxamides. When ethylene oxide and propylene oxide are used, these starter compounds can first be reacted with ethylene oxide and then with propylene oxide or preferably first with propylene oxide and then with ethylene oxide. Further details concerning these block copolymers are available from WO 2004/009688 A2 (page 7 line 20-page 9 line 26), expressly incorporated herein in this context by reference.

When surface-active substances are used as additives (c), their use level is generally in the range from 0.1 to 99% by weight and especially in the range from 2% to 30% by weight, based on the total amount of components (a) and (b).

Additization (c) with natural and artificial resins is likewise possible. Rosins and their derivatives are particularly useful. Use levels range in this case generally from 1% by weight to 50% by weight and preferably from 5% by weight to 30% by weight, based on the total amount of components (a) and (b).

Reaction conditions for the reaction in the context of the process according to the present invention are generally variable within wide limits depending, for example, on the amine or diamine used. Reaction temperature is preferably in the range from 0 to 250° C., more preferably in the range from 0 to 220° C. and most preferably in the range from 10 to 210° C.

The reaction pressure is preferably in the range from 0 to 22 bar and more preferably in the range from 0 to 20 bar. Reaction time varies distinctly with the nature of the reactants and is generally in the range from two to 40 hours.

A further preferred embodiment of the process according to the present invention comprises reacting the components (a), (b) ((i), (ii), (iii) and/or (iv)) and optionally (c) in the presence of a wetting agent (d).

The proportion of wetting agent (d) is at most 500% by weight, preferably 200% by weight and especially 100% by weight, based on the total mixture of components (a), (b) and optionally (c). The proportion of wetting agent is particularly preferably below 90% by weight and especially below 80% by weight. Useful wetting agents include for example high-boiling organic compounds. Preferred wetting agents are glycols, fatty alcohols, aromatic alcohols, sulfones or sulfoxides. Particular preference is given to ethylene glycol, diethylene glycol, triethylene glycol, dipropylene glycol, ethylene glycol monobutyl ether, methyl ethyl ketone, cyclohexanone, diacetone alcohol, dimethyl-formamide, dimethylacetamide, N-methylpyrrolidone, butyl acetate, glycerol triacetate, sulfolane and dimethyl sulfoxide. The use of a mixture of wetting agents is also possible, as will be appreciated.

Sufficient wetting agent (d) is advantageously used to form a kneadable or grindable mass.

The reaction in the process of the present invention is carried out in apparatus (mixing apparatus) effectuating a mixture of the components (a), (b) ((i), (ii), (iii), and/or (iv)) and optionally (c) and/or optionally (d); more particularly, these components are preferably kneaded or ground together.

Particularly preferred mixing apparatus represents a kneaderlike reactor, a single- or multi-part/shaft kneader, an extruder, a paddle dryer, a mixer or a mill. Single or multishaft kneaders are very particularly preferred.

The process of the present invention is likewise preferably carried out in a melt-mixing assembly as mixing apparatus. Such melt-mixing assemblies include for example screw kneaders, such as single-screw kneaders (for example co-kneaders, single-screw extruders, in particular with mixing and shearing sections), twin-screw kneaders (for example ZSK or ZE twin-screw extruders, Kombiplast extruders, MPC twin-screw kneader mixers, FCM two-stage mixers, KEX kneading screw extruders, and heavy roll extruders). Kneaders with or without a ram are also suitable, as are trough kneaders and Banbury mixers. A person skilled in the art will find details for example in Saechtling (ed.), Kunststoff-Taschenbuch, 27th edition, Carl Hanser Verlag Munich 1998, pp. 202-211.

One preferred embodiment of the process according to the present invention comprises an additional process step wherein, after essentially concluded reaction of the components (a) and (b) in the presence of optionally (c) and/or optionally (d), the reaction product, for example the crude pigment, is further processed in the same apparatus to form commercial material. A preferred method of further processing is salt kneading or salt grinding, as described for example in WO 2006/114403 A2 (page 7 line 14-page 8 line 23). In general, crystalline inorganic salts are used as kneading or grinding salts. The salts or salt mixtures customary for salt kneading and salt grinding operations can be used. Useful inorganic salts include water-soluble salts, in particular, for example, sodium chloride and sodium sulfate. It is customary to use technical grade salts with or without prior micronization. The median particle size of the salts is preferably in the range from 5 to 200 μm and more preferably in the range from 10 to 50 μm. The salts also advantageously have only a solubility of 100 mg/l, in particular ≤10 mg/l (both at 20° C.), in the optional wetting agent (d); preferably, they are virtually insoluble therein. The weight ratio of salt to reaction product can be up to 12:1 and is preferably in the range from 3:1 to 9:1.

In one preferred embodiment of the process according to the present invention, the optional wetting agent (d) is added to the reaction product after essentially concluded reaction, but before or during further processing, in particular by salt kneading or salt grinding. It is particularly preferable to add the wetting agent before further processing. The amount of wetting agent needed per 100 g of salt is typically about 10 to 45 ml.

In general, the millbase for the salt kneading or grinding comprises per g of reaction product, for example per g of crude pigment, from 0.5 to 2 g and preferably from 0.6 to 1 g of wetting agent (d) and from 1 to 10 g and especially from 3 to 8 g of inorganic salt.

The optional wetting agent (d) added before or during salt kneading or grinding preferably has a solubility in water of at least 10 g/100 ml and is preferably neutral, although acidic or basic impurities are not disruptive.

After kneading, the inorganic salt and the optional wetting agent (d) can be washed off with water.

The kneading or grinding time is typically in the range from 0.5 to 24 h and especially in the range from 1 to 16 h.

The salt kneading in accordance with the present invention can be carried out by cooling or heating at temperatures ranging from below 0° C. to 220° C., preferred kneading temperatures are in the range from 80 to 200° C. Useful kneading assemblies include in particular, as already mentioned above, single-screw and twin-screw kneaders and mullers. The speed of rotation is advantageously chosen such that the material is agitated homogeneously and with uniform shearing. The kneaded material obtained can be worked up by stirring into water, filtering, washing with water and drying. Advantageously, the dried product can be subjected to a deagglomerating grind in pin, rotor or jet mills for example. Alternatively, the aqueous filter cake can also be freeze or spray dried.

Salt grinding can be carried out in continuous or batch ball mills, swing mills or attritors by using the customary grinding media and/or, if appropriate, beater bars.

The salt grinding in accordance with the present invention is preferably carried out in the absence of any organic solvent. In individual cases, however it may be advantageous to add an organic solvent in amounts of about 0.1% to 10% by weight, based on the reaction product. Useful solvents include for example xylene and dialkyl phthalates, for example dimethyl phthalate.

Grinding temperatures are generally in the range from room temperature to 130° C. and preferably in the range from 40 to 110° C.

Grinding times must in each case be adapted to the grinding assembly used.

The grinding in accordance with the present invention can take place in air, but is preferably carried out under inert gas.

The millbase obtained can be worked up as described for the salt kneading.

In one embodiment, the present invention's process for producing colorants of the general formulae (Ia), (Ib) or (Ic) consists of a plurality of process steps which can proceed in succession or else simultaneously. For example, the process of the present invention comprises the following process steps (I)-(IX):

(I) adding component (a),
(II) adding component (b) ((i), (ii), (iii) and/or (iv)),
(III) optionally adding component (c),
(IV) optionally adding component (d), (V) thermal reaction in a mixing apparatus,
(VI) cooling,
(VII) optionally adding inorganic basic salt or (in)organic acid
(VIII) optionally further processing, in particular by salt kneading,
(IX) optionally working up, for example by addition of water, filtration, drying.

It will be understood that the adding of the individual components in step (I)-(IV) can be effected not only continuously but also batchwise. Furthermore, regarding the thermal reaction (V), the raising of the temperature to the desired end value for the temperature can be effected not only continuously but also in stages. The same holds for cooling (VI). Process steps (VII) and (VIII) can also be swapped. The addition of the additives (c) in step (III) can also take place after the reaction (V) or before or during the further processing (VIII). As already mentioned, the addition of the wetting agent (d) in step (IV) can also take place after the reaction (V) or before or during the further processing (VII).

The present invention further provides for the use of the colorants obtained according to the present invention for coloration of macromolecular organic and inorganic materials of natural and synthetic origin.

Use for coloration of plastics, paints or printing inks is preferred.

The colorants obtained by the process according to the present invention can be incorporated in plastics by any known method, for example by conjoined extrusion, rolling, kneading, pressing or grinding, in which case the plastics comprising the perylene pigments can be processed to form plastics moldings, continuous profiles, plates, sheets, fibers, films and coatings.

Further processing possibilities, including for use in macromolecular inorganic materials, are indicated in WO 2005/078023, page 15 line 22-page 18 line 6, expressly incorporated herein in this context by reference.

The colorants of the present invention are very useful for coloration of macromolecular organic and inorganic materials of natural and synthetic origin.

Further possible applications are indicated in WO 2005/078023, page 15 line 22-page 18 line 6, fully incorporated herein in this context by reference. This reference is thereby made part of the disclosure content of the present invention. The colorants obtained according to the present invention are further useful as active components in photovoltaics.

Examples of macromolecular synthetic organic materials include:

polyolefins, such as polyethylene, polypropylene, polybutylene, polyisobutylene and poly-4-methyl-1-pentene, polyolefin copolymers, such as Luflexen® (Basell), Nordel® (Dow) and Engage® (DuPont), cycloolefin copolymers, such as Topas® (Celanese), polytetrafluoroethylene (PTFE), ethylene-tetrafluoroethylene copolymers (ETFE), polyvinylidene difluoride (PVDF), polyvinyl chloride (PVC), polyvinylidene chloride, polyvinyl alcohols, polyvinyl esters, such as polyvinyl acetate, vinyl ester copolymers, such as ethylene-vinyl acetate copolymers (EVA), polyvinyl alkanals, such as polyvinyl acetal and polyvinyl butyral, (PVB), polyvinyl ketals, polyamides, such as Nylon® [6], Nylon [12] and Nylon [6,6] (DuPont), polyimides, polycarbonate, polycarbonate copolymers and physical blends of polycarbonates with acrylic-butadiene-styrene copolymers, acrylonitrile-styrene-acrylate copolymers, polymethyl methacrylates, polybutyl acrylates, polybutyl methacrylates, polybutylene terephthalates and polyethylene terephthalates, polyesters such as polyethylene terephthalate (PET), polybutylene terephthalate (PBT) and polyethylene naphthalate (PEN), addition copolymers, transesterification products and physical mixtures (blends) of the aforementioned polyalkylene terephthalates, poly(meth)acrylates, polyacrylamides, polyacrylonitrile, poly(meth)acrylate-polyvinylidene difluoride blends, polyurethanes, polystyrene, styrene copolymers, such as styrene-butadiene copolymers, styrene-acrylonitrile copolymers (SAN), styrene-ethyl methacrylate copolymers, styrene-butadiene-ethyl acrylate copolymers, styrene-acrylonitrile-methacrylate copolymers, acrylonitrile-butadiene-styrene copolymers (ABS) and methacrylate-butadiene-styrene copolymers (MBS), polyethers such as polyphenylene oxide, polyether ketones, polysulfones, polyether sulfones, polyglycols such as polyoxymethylene (POM), polyaryls such as polyhenylene, polyarylene vinylenes, silicones, ionomers, thermoplastic and thermoset polyurethanes and also mixtures thereof.

Examples of macromolecular synthetic inorganic materials include:

low-melting borosilicate glass frits, optionally organically modified silicate sols and gels, sol-gel process produced, optionally doped silicate, aluminate, zirconate and aluminosilicate coatings and sheet-silicates.

It is likewise advantageous to use previously separately obtained colorant preparations based on a polymer or a polymer blend, one or more polyolefin waxes or mixtures thereof to obtain homogeneous, strong colorations in low-melting polymers (the most common polyolefins for example) or those of low melt viscosity (for example plasticized PVC and PVB and also blow-moldable PET). While the carrier polymer (blend) used in the case of the polymer-based colorant preparations ("masterbatches", "compounds") is generally identical to the macromolecular synthetic organic material to be colored, pigment preparations based on polyolefin wax utilize in particular homo- and copolymeric PE and PP waxes such as Luwax® A (ethylene homopolymer; BASF), Luwax EVA (ethylene-vinyl acetate copolymer; BASF) or Licowax® PP 230 (propylene homopolymer; Clariant) as carrier material.

The process of the present invention permits the efficient production of colorants. The process of the present invention does not require the use of large amounts of solvent. Combining reaction and further processing in one overall process is a direct way of obtaining a commercial product. And, compared with a solvent synthesis, significantly higher concentrations can be used. The reaction at relatively low temperatures makes for an energy- and material-sparing production process. Especially the reaction of bisanhydrides with different amines or diamines is possible under mild reaction conditions.

The preceding embodiments of the process according to the present invention and the examples which follow illustrate the present invention by way of example. However, many further variations of the process and combinations of the features of the process according to the present invention are conceivable by a person skilled in the art without going beyond the scope of the claims.

EXAMPLES

Example 1

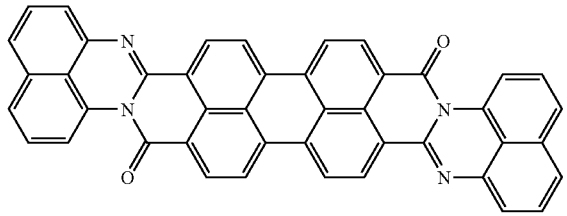

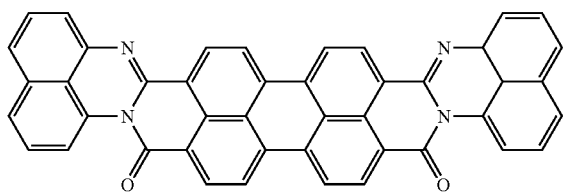

A Duplex kneader from Ika was charged with 78 g of perylenebisanhydride (198 mmol), 16 g of piperazine (186 mmol), 61 g of 1,8-diaminonaphthalene (386 mmol) and 55 g of tetraglycol, and this initial charge was kneaded while being heated to 200° C. over an hour and reacted at 200° C. for 4 hours.

After cooling to room temperature, the kneaded material was introduced into 2% potash solution and stirred at 70° C. for two hours.

The suspension was filtered off and washed in succession with water, 10% acetic acid and water. Drying at 80° C. left 121 g of black perylene pigment, corresponding to 98% of theory, in the form of a black powder.

Example 2

A Duplex kneader from Ika was charged with 34 g of perylenebisanhydride (87 mmol), 7 g of piperazine (81 mmol), 27 g of 1,8-diaminonaphthalene (173 mmol) and 35 g of tetraglycol, and this initial charge was kneaded while being heated to 180° C. over four hours and reacted at 180° C. for 8 hours.

After cooling to room temperature, 158 g of sodium sulfate and a further 25 g of tetraglycol were added, kneading was continued while heating to 180° C. and further processing for eight hours. After cooling to 60° C., the reacted material was introduced into 1000 ml of water, 3 g of potash were added and the mixture was stirred at 70° C. for one hour.

The suspension was filtered off and washed in succession with water, 10% acetic acid and water. Drying at 110° C. left 54 g of black perylene pigment, corresponding to 97% of theory, in the form of a black powder.

Example 3

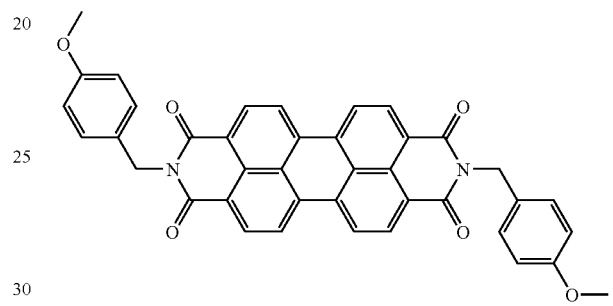

A Duplex kneader from Ika was charged with 80 g of perylenebisanhydride (205 mmol), 64 g of 4-methoxybenzylamine (466 mmol) and 50 g triglycol, and this initial charge was kneaded while being heated to 135° C. over 90 minutes and reacted at 135° C. for 5 hours.

After cooling to room temperature, 158 g of sodium sulfate and a further 25 g of tetraglycol were added, kneading was continued while heating to 180° C. and further processing for eight hours. After cooling 60° C., the reacted material was introduced into 1000 ml of water, 3 g of potash were added and the mixture was stirred at 70° C. for one hour.

The suspension was filtered off and washed in succession with water, 10% acetic acid and water. Drying at 110° C. left 54 g of black perylene pigment, corresponding to 97% of theory, in the form of a black powder.

MS (MALDI): m/z (%): 630 (100) [M]–, 510 (5) [M(monoimide)]–.

Example 4

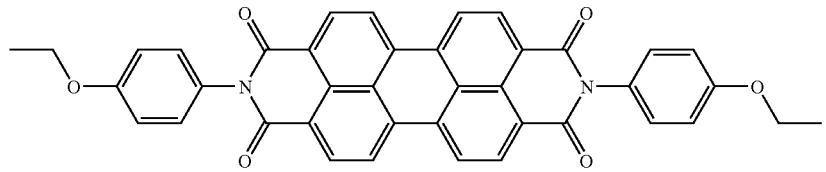 [SMILES: CCOc1ccc(N2C(=O)c3ccc4c5ccc6c7c(ccc(c8ccc(c3c48)C2=O)c75)C(=O)N(c2ccc(OCC)cc2)C6=O)cc1]

A Duplex kneader from Ika was charged with 85 g of perylenebisanhydride (217 mmol), 60 g of 4-ethoxyaniline (438 mmol) and 40 g of triglycol, and this initial charge was kneaded while being heated to 180° C. over six hours and reacted at 180° C. for eight hours.

After cooling to room temperature, the reacted material was suspended in 1.5 liter of water and heated to 70° C. and stirred for one hour. After addition of 2 g of potash the suspension was stirred for another hour at 80° C. The suspension was filtered off and washed in succession with water, 10% acetic acid and water.

Drying at 110° C. left 87 g of black perylene pigment, corresponding to 67% of theory, in the form of a reddish brown powder.

MS (MALDI): m/z (%): 631 (100) [M+H]+, 653 (2) [M+Na]+.

Example 5

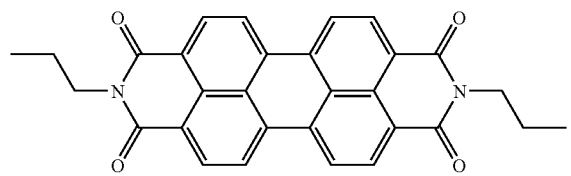 [SMILES: CCCN1C(=O)c2ccc3c4ccc5c6c(ccc(c7ccc(c2c37)C1=O)c64)C(=O)N(CCC)C5=O]

A Duplex kneader from Ika was charged with 85 g of perylenebisanhydride (217 mmol), 29 g of propylamine (491 mmol) and 36 g of triglycol, and this initial charge was kneaded while being reacted at 25° C. for five hours.

The kneaded material is introduced into an initial charge of 1400 ml of water, adjusted to pH 6 with sulfuric acid and filtered off with suction. Drying leaves 88 g (86%) of the colorant in the form of a brownish black powder.

Example 6

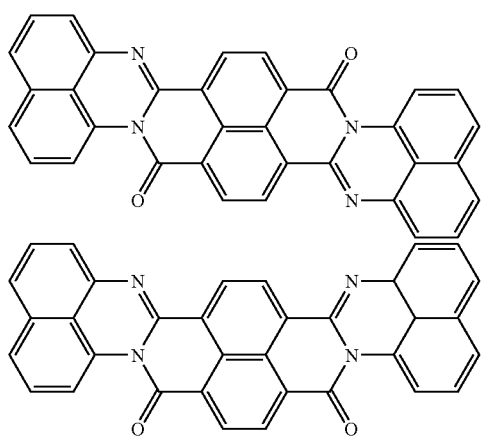

In a Duplex kneader from Ika, 76 g of 1,4,5,8-naphthylenetetracarboxylic dianhydride, 93 g of 1,8-diaminonaphthalene and 33 g of triglycol were reacted at 160° C. for six hours with kneading. After suspending in one liter of water, the suspension was stirred at 80° C. for one hour and the product was isolated via filtration and dried at 120° C. to leave 119 g of the perinone pigment (79% of theory) in the form of a black powder.

MS (MALDI): m/z (%): 512 (100) [M]+, 535 (5) [M+Na]+.

Example 7

A swing mill with 60 steel balls (2.5 cm in diameter) is charged with 78 g of perylenebisanhydride (198 mmol), 16 g of piperazine (186 mmol), 61 g of 1,8-diaminonaphthalene (386 mmol) and 55 g of tetraglycol, and this initial charge is ground while being heated to 180° C. over one hour and reacted at 180° C. for 8 hours.

After cooling to room temperature, the ground material is introduced into 2% potash solution and stirred at 70° C. for two hours.

The suspension is filtered off and washed in succession with water, 10% acetic acid and water. Drying at 80° C. leaves a perylene pigment in the form of a black powder.

Example 8

A Duplex kneader from Ika is charged with 78 g of perylenebisanhydride (198 mmol), 16 g of piperazine (186 mmol), compound A, compound B and 55 g of tetraglycol, and this initial charge is kneaded while being heated to 200° C. over an hour and reacted at 200° C. for 4 hours.

After cooling to room temperature, the kneaded material is introduced into 2% potash solution and stirred at 70° C. for two hours.

The suspension is filtered off and washed in succession with water, 10% acetic acid and water. Drying at 80° C. leaves black perylene pigment in the form of a black powder.

| Run | Compound A | Compound B |
|---|---|---|
| 1st | 4.1 g of 1,2-diaminobenzene (38 mmol) | 55 g of 1,8-diaminonaphthalene (348 mmol) |
| 2nd | 50 g of p-ethoxyaniline (367 mmol) | 0.6 g of methylamine (19 mmol) |
| 3rd | 22 g of propylamine (367 mmol) | 0.6 g of methylamine (19 mmol) |
| 4th | 46 of xylidine (378 mmol) | 0.9 g of 1,2-diaminobenzene (8 mmol) |

Test 9

A Duplex kneader from Ika is charged with 39 g of perylenebisanhydride, 36 g of 1,4,5,8-naphthylenetetracarboxylic dianhydride, 16 g of piperazine, 61 g of 1,8-diaminonaphthalene and 55 g of tetraglycol, and this initial charge is kneaded while being heated to 200° C. over an hour and reacted at 200° C. for 4 hours.

After cooling to room temperature, the kneaded material is introduced into 2% potash solution and stirred at 70° C. for two hours.

The suspension is filtered off and washed in succession with water, 10% acetic acid and water. Drying at 80° C. leaves black perylene pigment in the form of a black powder.

I claim:

1. A process for preparing a colorant of formula (Ia), (Ib) or (Ic), the process comprising:
    reacting, in a mixing apparatus, a reaction mixture comprising
    (a) a tetracarboxylic acid or an anhydride, bisanhydride, an acid chloride, or a salt of the tetracarboxylic acid, with a base comprising
    (b) at least one selected from the group consisting of
        (b1) an aliphatic amine,
        (b2) an aromatic amine, (b3) an aliphatic diamine, and
(b4) an aromatic diamine,
to obtain a product compound of formula (Ia), (Ib), or (Ic), or a mixture thereof

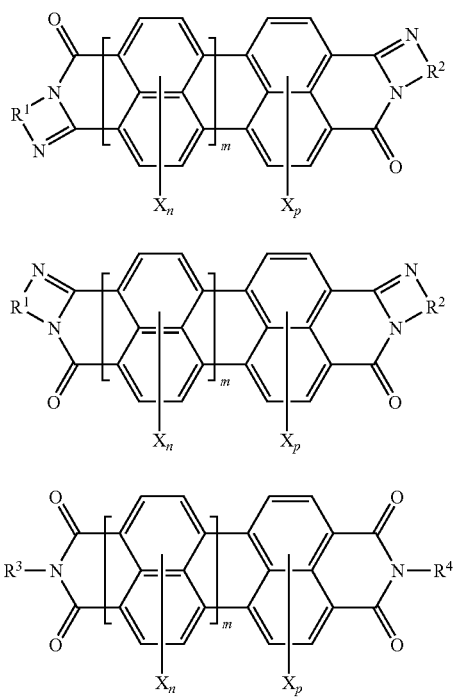

wherein $R^1$ and $R^2$ are the same or different and independently represent phenylene, naphthylene, pyridylene,

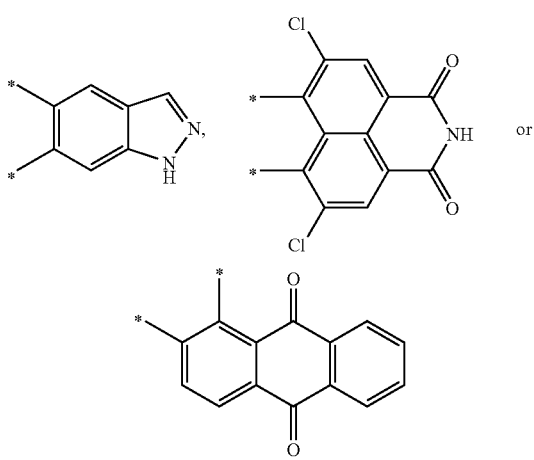

and $R^1$ and $R^2$ each are optionally substituted one or more times by at least one substituent selected from the group consisting of $C_1$-$C_{22}$-alkyl, $C_3$-$C_{22}$-alkenyl, $C_1$-$C_{22}$-alkoxy, hydroxyl, nitro, and halogen, $R^3$ and $R^4$ are the same or different and independently represent hydrogen, $C_1$-$C_{22}$-alkyl, aryl, $C_1$-$C_{22}$-aralkyl,

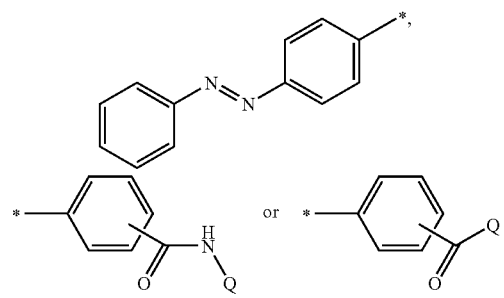

Q: $C_1$-$C_{20}$-alkyl, aryl and $R^3$ and $R^4$ each are optionally substituted one or more times by at least one substituent selected from the group consisting of $C_1$-$C_{22}$-alkyl, $C_1$-$C_{22}$-alkoxy, hydroxyl, nitro, and halogen, X in each occurrence is the same or different and independently represents halogen, n and p are independently 0, 1, 2, 3, or 4, and m is 0, 1, 2, 3, or 4 wherein the mixing apparatus is a kneader-like reactor, a single-shaft kneader, or a multi-part/shaft kneader, wherein the reacting is carried out in the presence of at most 100 wt. % of (d) a wetting agent, based on a total weight of all other components in the reaction mixture, and wherein the reacting is carried out in no solvent other than said wetting agent.

2. The process of claim 1, further comprising:
further processing the product compound in the form of a resulting crude pigment in the mixing apparatus.

3. The process of claim 2, wherein the further processing is effected by salt kneading.

4. The process of claim 2, wherein the further processing is effected in the presence of (c) an additive, in an amount from 1% to less than 50% by weight, based on a weight of components (a) and (b) in the reaction mixture.

5. The process of claim 4, wherein the wetting agent (d) is present in an amount of up to 90% by weight, based on a weight of components (a), (b), and (c) in the reaction mixture.

6. The process of claim 1, wherein $R^1$ and $R^2$ are the same and each represent unsubstituted phenylene or naphthylene.

7. The process of claim 1, wherein $R^3$ and $R^4$ are the same and each represent alkoxyphenyl, methyl, propyl, 2,4-dimethylphenyl, hydrogen or

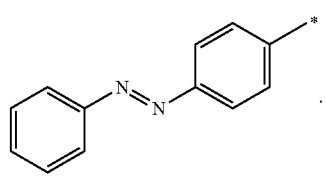

8. A method for coloring a macromolecular organic or inorganic material of natural and synthetic origin, comprising:
combining with the material, the product made by the process of claim 1.

9. The process of claim 1, further comprising:
coloring a plastic, a paint, or a printing ink with the colorant.

10. The process of claim 1, wherein the base comprises (b1) the aliphatic amine.

11. The process of claim 1, wherein the base comprises (b2) the aromatic amine.

12. The process of claim 1, wherein the base comprises (b3) the aliphatic diamine.

13. The process of claim 1, wherein the base comprises (b4) the aromatic diamine.

14. The process of claim 1, wherein $R^1$ is phenylene.

15. The process of claim 1, wherein $R^1$ is naphthylene.

16. The process of claim 1, wherein the wetting agent (d) is at least one selected from the group consisting of a glycol, a fatty alcohol, a sulfone, a sulfoxide, diacetone alcohol, dimethylformamide, dimethylacetamide, N-methylpyrrolidone, butyl acetate, and glycerol triacetate.

17. The process of claim 1, wherein the wetting agent (d) comprises a glycol.

18. The process of claim 1, wherein the wetting agent (d) comprises at least one selected from the group consisting of triglycol and tetraglycol.

19. The process of claim 1, wherein the wetting agent (d) is present in an amount of up to 57.3% by weight, based on a weight of components (a) and (b) in the reaction mixture.

20. The process of claim 4, wherein the additive (c) comprises at least one selected from the group consisting of a secondary amine and a tertiary amine.

* * * * *